United States Patent Office 3,495,899
Patented Feb. 17, 1970

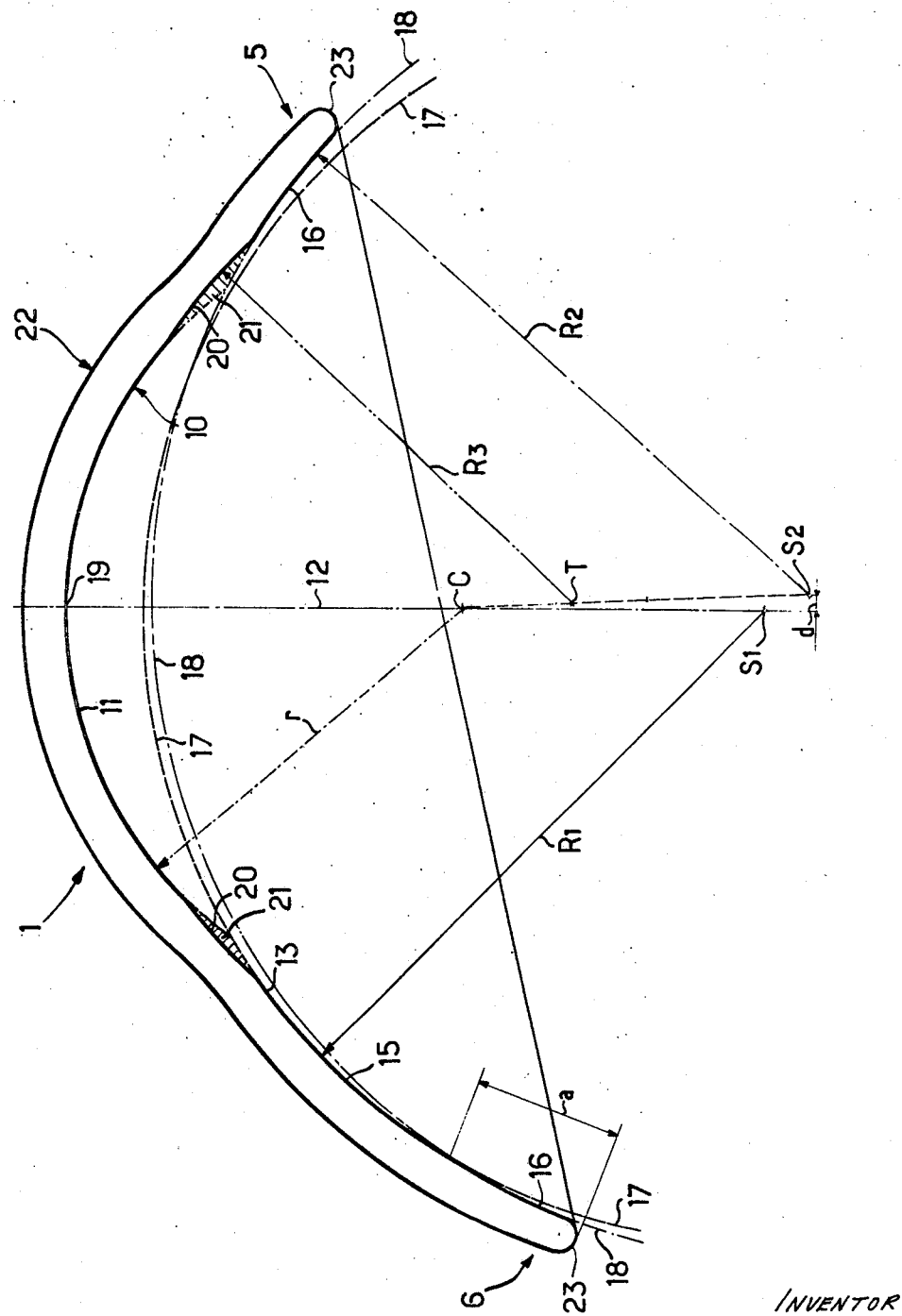

3,495,899
SCLERAL CONTACT LENSES
Henri Biri, Saint-Maur, France, assignor to Les Freres Lissac Opticiens S.A., Paris, France, a corporation of France
Filed Nov. 13 1967, Ser. No. 682,074
Claims priority, application France, Dec. 5, 1966, 86,098
Int. Cl. G02c 7/04
U.S. Cl. 351—160          3 Claims

ABSTRACT OF THE DISCLOSURE

A scleral contact lens having its rear face formed as a frusto-spherical corneal zone and two frusto-spherical scleral regions the centre of curvature of one scleral region being disposed on the central axis through the corneal zone and the centre of curvature of the other scleral region being displaced to the nasal side of the said corneal zone axis.

BACKGROUND OF THE INVENTION

Field of the invention

This invention relates to improvements in scleral contact lenses. A scleral contact lens comprises three main parts on its rear face, namely a scleral zone, which covers the sclera of the wearer's eye, a central corneal zone covering the wearer's cornea and has a spherical surface, and an intermediate zone connecting the corneal and scleral zones and covering the area of the eye where the corneal zone merges into the scleral zone round the cornea.

Description of the prior art

Hitherto three processes have been used for making scleral contact lenses. The first known process, known as ocular moulding, comprises taking an impression of the eyeball and then taking a plaster cast of the impression from which the contact lens is moulded. This is a long and complex process, often unpleasant for the patient.

The second known process devolves from the first process and comprises using general moulds for moulding, statistically resulting from a large number of ocular moulds.

These two known processes necessitate the use of moulded lenses which must be relatively thick if they are to resist deformation due to the effect of what is known as the memory of plastic material.

The third known process is geometrically accurate in itself and consists in making lenses generally by moulding and finishing the surface shape to geometrical shapes such as spherical, torsidal or conical. It may be faithfully reproduced, since the precise surface characteristics are known and can be modified. On the other hand by this process it is only possible to produce surface shapes which are approximately the actual shape of the eyeball.

Numerous observations have shown that the shape of the eyeball is inconstant, since when the eyeball moves it is deformed under the action of the eye muscles. The internal right muscle of the eye generally creates the maximum deformation of the eyeball due to the position at which it is connected to the eyeball, namely near to the cornea.

Thus it has been established that when a patient's eyes have converging lines of sight, as when the patient is reading for example, the nasal portion of the eyeball flattens out considerably and even sometimes assumes a conical shape, whereas the temporal portion of the eyeball is more regularly spherical, although its peripheral zone is nevertheless flat.

Due to this fact, a scleral contact lens fitted to be suitable in the primary position of the wearer looking straight ahead by one of the three first processes, becomes out of focus for an oblique position of the eyeball, particularly where the lines of sight of the wearer's eyes are convergent. This results in discomfort, particularly for close vision as in reading for example.

The main object of the present invention is to produce a scleral contact lens which the wearer can use as much with ease as with lenses made by the aforesaid third process and permitting rapid adaptation, with a considerable increase in tolerance.

SUMMARY

According to the present invention a scleral contact lens comprises on its rear face a central corneal zone in the form of a frusto-spherical cap, and two scleral regions formed as frusto-spherical portions, the centre of curvature of one scleral region being on the axis centrally through the corneal zone, and the centre of curvature of the other scleral region being displaced to the nasal side of the corneal zone axis.

In a preferred construction, the centre of curvature of the second scleral region is a greater distance from the corneal zone than that of the first scleral region, while the radius of curvature of the first scleral region is less than that of the second scleral region.

In this way a scleral contact lens is obtained by machine turning, in which the scleral region on the nasal side as a whole has the radius of curvature of the second scleral region, but is more flattened than it would be in a convention contact lens, which corresponds to the conditions to be attained, whilst in the temporal region, it is only the periphery of the scleral region which shows the flattening introduced by the second frusto-spherical surface thereof.

BRIEF DESCRIPTION OF THE DRAWING

In order that the invention may be more fully understood an embodiment in accordance therewith will now be described by way of example with reference to the accompanying drawing which shows a scleral contact lens in cross-section along a diametral plane extending between the nasal and temporal regions.

DESCRIPTION OF THE PREFERRED EMBODIMENT

Referring to the drawing the scleral contact lens 1 has a nasal region 5 and a temporal region 6, and central corneal zone 11 on its rear concave face 10 forming a frusto-spherical cap, the central axis through which is indicated at 12 with its centre of curvature at C and having a radius $r$; this corneal zone is surrounded by the scleral zone indicated generally at 13.

The scleral zone comprises two regions 15, 16 each having a frusto-spherical surface 17, 18 respectively, the surface 17 corresponding to the region 15 having its centre of curvature at S1 on the axis 12 and having a radius R1, whilst the surface 18 corresponding to the region 16 has its centre of curvature at S2 which is displaced from the axis 12 towards the nasal side 5 of the lens. In this example, the point S2 is slightly further away from the apex 19 of the corneal zone than the centre S1 and the radius R2 of this second frusto-spherical surface is slightly greater than the radius R1.

Where the scleral glass is machine turned in a rough cast of plastic material, the corneal zone 11 centred on the axis 12 is first produced, then the frusto-spherical surface 17 is turned. Up to then the process of manufacture is similar to that used for the conventional scleral lenses and the scleral zone is defined by the surface 17 alone. The machine is then adjusted so that the cutting tool follows the frusto-spherical surface 18. During this operation, as will be seen from the drawing, the material is removed from the nasal side 5 of the lens over the entire scleral zone, and from the temporal side 6, only on the periphery of the rough cast, since the centre of curvature S2 is displaced towards the nasal side.

Thus are successively defined the scleral regions 15, adjacent to the corneal zone on the temporal side, and 16, adjacent to the zone 15 and, in the nasal region itself, adjacent to the corneal zone.

The radius of curvature of the nasal zone has been increased both on the periphery of the lens and on the temporal side. The flattening thereby produced in these two regions corresponds satisfactorily to the modifications observed on the eyeball so that not only is the final adaptation much more rapid and easy but the comfort and tolerance of the wearer is increased in comparison with the known lenses.

The intermediate zone of the lens corresponding to the area of the eyeball and separating the corneal zone 11 from the scleral zone 13 is formed by an annular frusto-spherical band 20 of radius R3 and with its centre of curvature T between C and S2 and preferably colinear with the C and S2. It is produced by machining which is likewise effected by turning which enables the portion of the material shown as a shaded portion 21 to be eliminated from the rough cast.

The lens is then finished by machining its outer face 22 and its edge 23 to a suitable shape and profile.

It will be seen that owing to the removal of the material especially from the nasal side, by the machining of the second scleral region 16, the lens is nearer the eye in the corneal zone than in a conventional lens. Thus it is advisable to impart a smaller radius of curvature to the corneal zone, for example for the same diameter.

As the resultant centering is of better quality than in conventional lenses, it is possible to reduce the diameter of the external optic in the corneal region.

By way of example for a scleral contact lens of an inside diameter of 24 mm., the following values (in mm.) are employed for the aforesaid parameters:

$r = 8.50$
$R1 = 13.00$
$R2 = 13.75$
$d = 0.30$ (offset distance of S2 from the corneal axis 12)
$a = 3.00$ (width of the second scleral region 16 on the temporal side of the lens)

Likewise, although the manufacturing process mentioned involves machine turning, the lens may be produced in any other suitable manner, for example by moulding from moulds machined in a suitable manner.

I claim:

1. A scleral contact lens comprising on its rear face a central corneal zone which is a portion of a first sphere and is adapted to cover at least a portion of the cornea of the eye from the nasal side to the temporal side thereof, and a peripheral scleral zone surrounding the said corneal zone, the said scleral zone comprising successively a first region which is a portion of a second sphere of greater radius of curvature than said first sphere having its center disposed on the optical axis passing through the center of the said corneal zone, and a second region which is a portion of a third sphere of greater radius of curvature than said second sphere having its center transversely displaced with regard to said axis, in the direction of said nasal side, so that the said scleral zone is geometrically asymmetrical with regard to said optical axis, the nasal side of the scleral zone being of lesser width than the temporal side and having the curvature of said second region.

2. A scleral contact lens according to claim 1 wherein an intermediate zone is provided between said corneal zone and said first and second scleral regions and comprises an annular frusto-spherical band having a centre of curvature substantially colinear with said centres of curvature of said corneal zone and said second scleral region and having a radius of curvature greater than that of said corneal zone and less than that of said first scleral region.

3. A scleral contact lens according to claim 1, wherein the inside diameter of the lens is about 24 mm., the radius of the first sphere is about 8.5 mm., the radius of the second sphere is about 13 mm. and the radius of the third sphere is about 13.75 mm., the offset distance between the centers of said second and third spheres being about 0.3 mm.

References Cited

UNITED STATES PATENTS

| | | | |
|---|---|---|---|
| 1,921,972 | 8/1933 | Fertsch et al. | 351—160 |
| 2,641,161 | 6/1953 | Silverstein | 351—160 |

FOREIGN PATENTS

| | | |
|---|---|---|
| 621,448 | 4/1949 | Great Britain. |
| 634,448 | 3/1950 | Great Britain. |

OTHER REFERENCES

Gabe: "A New Preformed Scleral Lens," article in Optometric Weekly, vol. 56, No. 15, Apr. 15, 1965, pp. 23–26 cited.

DAVID H. RUBIN, Primary Examiner